(12) United States Patent
Loeben (10) Patent No.: US 10,836,224 B2
(45) Date of Patent: Nov. 17, 2020

(54) METHOD FOR DETERMINING OBJECT BOUNDARIES OF AN OBJECT OUTSIDE OF A TRANSPORTATION VEHICLE AND CONTROL DEVICE AND TRANSPORTATION VEHICLE

(71) Applicant: VOLKSWAGEN AKTIENGESELLSCHAFT, Wolfsburg (DE)

(72) Inventor: Dennis Loeben, Berlin (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 177 days.

(21) Appl. No.: 16/161,244

(22) Filed: Oct. 16, 2018

(65) Prior Publication Data

US 2019/0118594 A1    Apr. 25, 2019

(30) Foreign Application Priority Data

Oct. 25, 2017 (DE) .................. 10 2017 219 123

(51) Int. Cl.
*G06K 9/00* (2006.01)
*B62D 13/06* (2006.01)
(Continued)

(52) U.S. Cl.
CPC .................. *B60D 1/30* (2013.01); *B60D 1/62* (2013.01); *B62D 13/06* (2013.01);
(Continued)

(58) Field of Classification Search
None
See application file for complete search history.

(56) References Cited

U.S. PATENT DOCUMENTS

2014/0267689 A1* 9/2014 Lavoie .................. H04N 7/183
348/113
2014/0303849 A1* 10/2014 Hafner .................. B60W 50/14
701/42
(Continued)

FOREIGN PATENT DOCUMENTS

DE    102004050149 A1    4/2006
DE    102008045436 A1    3/2010
(Continued)

OTHER PUBLICATIONS

Search Report for German Patent Application No. 10 2017 219 123.6; dated Mar. 9, 2018.

*Primary Examiner* — Idowu O Osifade
(74) *Attorney, Agent, or Firm* — Barnes & Thornburg LLP (57) ABSTRACT

A method for determining object boundaries of an object outside of a transportation vehicle, wherein images of the object are generated by a control apparatus by a camera, and at least one scanline is specified in a first image and a corresponding scanline is specified for each scanline in every other image, and a profile resulting along the scanline is determined for each scanline of the first image, and a corresponding resulting profile is determined along the respective corresponding scanline of every other image, and the corresponding profile of every other image, displaced by a respective displacement distance, is overlaid on the profile of each scanline of the first image, and a reference pattern is determined in the resulting overlay profile of each scanline, and respective boundaries of the reference pattern are indicated as the respective object boundaries.

27 Claims, 4 Drawing Sheets

(51) Int. Cl.
*B60D 1/62* (2006.01)
*B60D 1/30* (2006.01)
*G06F 16/583* (2019.01)

(52) U.S. Cl.
CPC ..... *G06F 16/5854* (2019.01); *G06K 9/00536* (2013.01); *G06K 9/00791* (2013.01); *G06K 9/00825* (2013.01)

(56) References Cited

U.S. PATENT DOCUMENTS

| | | | |
|---|---|---|---|
| 2017/0073003 A1* | 3/2017 | Shepard | B62D 13/06 |
| 2017/0129403 A1* | 5/2017 | Lavoie | B62D 15/027 |
| 2017/0297619 A1* | 10/2017 | Lavoie | B62D 15/024 |
| 2019/0009815 A1* | 1/2019 | Lavoie | B62D 15/0285 |
| 2020/0031392 A1* | 1/2020 | Lavoie | B60D 1/245 |

FOREIGN PATENT DOCUMENTS

| | | |
|---|---|---|
| DE | 102011104256 A1 | 7/2012 |
| DE | 102011101990 B3 | 10/2012 |
| DE | 102011113191 A1 | 3/2013 |
| DE | 102014223141 A1 | 5/2016 |
| DE | 102015201586 A1 | 8/2016 |

* cited by examiner

METHOD FOR DETERMINING OBJECT BOUNDARIES OF AN OBJECT OUTSIDE OF A TRANSPORTATION VEHICLE AND CONTROL DEVICE AND TRANSPORTATION VEHICLE

PRIORITY CLAIM

This patent application claims priority to German Patent Application No. 10 2017 219 123.6, filed 25 Oct. 2017, the disclosure of which is incorporated herein by reference in its entirety.

SUMMARY

Illustrative embodiments relate to a method for determining object boundaries of an object in an external region of a transportation vehicle. The object here is attached to the transportation vehicle, but mounted in such a way that it can move relatively. It can, for example, be a trailer. A control apparatus for carrying out the method and a transportation vehicle with the disclosed control apparatus are also disclosed.

BRIEF DESCRIPTION OF THE DRAWINGS

An exemplary embodiment is described below with reference to the drawings, in which.

DETAILED DESCRIPTION

A driver assistance system can be made available in a transportation vehicle which can support a driver driving the transportation vehicle while a trailer is coupled to the transportation vehicle. When driving along a curve (forwards and backwards) the maximum bend angle that can be achieved between the transportation vehicle and the trailer is an important parameter here for the driver assistance system to prevent the trailer and the transportation vehicle from colliding or jamming. In today's driver assistance systems, the value of the bend angle is stipulated independently of the true form of the trailer towbar of the trailer. The widest possible shape of the towbar has to be assumed always to ensure that jamming does not result for a large number of possible shapes. As a result, however, the driver is restricted in terms of driving dynamics, above all when the trailer towbar is narrow.

A method for determining the current bend angle between a transportation vehicle and a trailer coupled thereto is known from DE 10 2011 113 191 A1. The method is based on an edge detection in an image from a reversing camera. While the method can indeed recognize the true bend angle, it cannot however predict the maximum possible bend angle.

A method for determining a bend angle between a transportation vehicle and trailer is also known from DE 10 2008 045 436 A1. The bend angle is determined in the method by comparing an image from a camera with a reference image. The reference image shows the trailer towbar of the trailer at a known bend angle. In this method, corresponding reference images must be made available for all shapes of trailer towbar that are expected to be used with the transportation vehicle.

A method for determining a towbar angle that makes use of a model of the trailer with towbar is known from DE 10 2004 050 149 A1. Here again, a suitable model must be made available for every shape of towbar that is expected to be used with the transportation vehicle, which makes the method expensive.

A method for determining a bend angle between a transportation vehicle and trailer is known from DE 10 2011 104 256 A1, wherein image features characterizing the towbar are determined in an image from a camera, and the position of the image features compared with the position of the same image features in a reference image. Direction vectors can be determined from this, from which the bend angle can be deduced. The method requires an extensive calibration phase in which the bend angle for the reference image must be known.

The problem described, however, is more general. Whenever an object is attached to a transportation vehicle in such a way that it can move relatively, it is beneficial to know where the object boundaries of the object are located, for example, to determine from this the maximum possible bend angle at which the object touches the transportation vehicle with its object boundaries or collides with it.

A method for determining a relative towbar angle in an articulated transportation vehicle is known from DE 10 2011 101 990 B3, wherein a correlation is carried out between two camera images along arc-shaped image segments to recognize a relative displacement of the image contents, from which the towbar angle can be deduced.

A method for recognizing a trailer type on the basis of a camera image is known from DE 10 2015 201 586 A1, wherein a profile of color values of the image content is captured in the camera image along arc-shaped image segments, and characteristic features, edges for example, are then extracted in the respective profile, to then recognize the type of the trailer on the basis of the characteristic features and a comparison with a stored pattern.

Disclosed embodiments determine the object boundaries of an object that is attached or arranged to/on the transportation vehicle in such a way that it can move relatively in an external region of the transportation vehicle.

A method for determining object boundaries of an object in an external region of a transportation vehicle is made available. The method makes the assumption that the object is attached to the transportation vehicle in such a way that it can move relatively. An image is generated at each of least two different measurement time points by a camera by a control apparatus of the transportation vehicle while the transportation vehicle moves. The image shows the object in front of a background of the external region.

In a first one of the images at least one scanline is specified by the control apparatus. Sampling line is another name for scanline. A scanline is a line that extends over the image and hereby specifies a sequence of pixels that lie on the scanline. For each scanline a corresponding scanline is specified in every other image. This same scanline is thus defined in each image, wherein precisely one scanline of the first image corresponds to one respective scanline of every other image, which is why these scanlines are called corresponding scanlines.

For each scanline of the first image, a profile resulting along the scanline is determined for a predetermined image property, for example, the pixel brightness or pixel color. The respective values of the image property of each pixel are thus plotted along with scanline, so that the profile results as a curve. In addition, a corresponding resulting profile is also determined along the respective corresponding scanline of every other image. It is now thus possible to compare the profile of each scanline of the first image with the profile of the corresponding scanline of every other image. For the profile of each scanline of the first image, a respective displacement distance is accordingly determined through which the corresponding profile of every other image must be displaced with respect to the profile of this scanline to achieve a maximum agreement. The profile and the corresponding profile can, for example, be compared by a correlation for this purpose.

It is now known how far the profile has displaced along the scanline as a result of the relative movement of the object with reference to the transportation vehicle. The corresponding profile of every other image, displaced through the respective displacement distance, is overlaid on the profile of each scanline of the first image. The relative movements of the object with respect to the transportation vehicle are thus compensated for, in that each corresponding profile is pushed backwards, namely through the displacement distance, so that the corresponding profile of every other image comes to lie on the respective profile of each scanline of the first image. The overlay can, for example, be done by multiplying the profiles. Altogether, an overlay profile formed from the overlaid profiles thus results for each scanline. It is now important to know that each profile can comprise two components or segments, namely a segment that belongs to the object and segments that belong to the background. The background, however, changes continuously when the transportation vehicle is rolling or moving, while the object that is attached to the transportation vehicle remains the same. Thus, for each profile, the particular segment that belongs to the object always has the same or a similar curve. On the other hand, the segments that belong to the background change in every profile. Every segment that belongs to the background is thus "averaged out" through the overlaying. The segments which, on the other hand, belong to the object overlay constructively, which means that the pattern or the curve that is characteristic for the object forms in the overlay profile. The segments that belong to the background, on the other hand, have a curve that tends, for example, towards zero with each further overlaid profile. A reference pattern is accordingly determined in the overlay profile of each scan line on the basis of a predetermined demarcation criterion. This reference pattern is the curve of the profile resulting in the segment of the object. Respective boundaries of the reference pattern, i.e., the right-hand edge and the left-hand edge, or the front edge and the rear edge, are indicated as the respective object boundaries. It is thus possible to predict how far the object can be moved relative to the transportation vehicle before an object boundary of the object touches the transportation vehicle. The maximum displacement distance required for this can be converted into a corresponding relative movement of the object with respect to the transportation vehicle. For example, the maximum bend angle can be determined in this way for a trailer for which the trailer towbar can be recognized as an object.

The width of the object, or what object boundaries the object has, can be determined by the method, without knowledge of the geometry of the object, through observing the profiles of the various images. From this it is possible to determine what relative movement of the object with respect to the transportation vehicle is possible without this resulting in a collision.

Disclosed embodiments provide that the overlay profile is formed through addition or multiplication of the profiles. The described averaging-out of those components of the profile that belong to the background results from this.

At least one disclosed embodiment provides that the displacement distance of the profiles is determined by a correlation, and that the maximum agreement that is sought is specified here at a correlation maximum. This yields the benefit that a complex pattern recognition does not have to be carried out.

At least one disclosed embodiment provides that the demarcation criterion for the detection of the reference pattern allows for a threshold value comparison in the overlay profile. All those components of the overlay profile that lie on one side of the threshold value are ascribed to the reference pattern. The other components of the overlay profile are ascribed to the background. A simple procedure in terms of computation is assigned through the threshold value comparison when determining the reference pattern.

At least one disclosed embodiment provides that a driving surface of the transportation vehicle is captured by the camera as the background. The closer the background is to the camera, the greater is the change when the transportation vehicle makes a rolling movement. The background accordingly changes with a rolling movement of the transportation vehicle, so that a correspondingly unambiguous demarcation or segmentation between the object and the background is enabled through overlaying the profiles.

At least one disclosed embodiment provides that the predetermined image property on the basis of which the profiles are formed comprises a color value and/or a contrast value and/or a brightness value and/or an edge detection value of an image content of the image. Thus for each pixel that lies on a scanline, its color value (red, green, or blue, for example) and/or the brightness value, and/or a contrast value (difference of the brightness values of a pair of adjacent pixels) and/or an edge detection value, such as can be determined by an edge detection filter, is determined. An edge profile can thus, for example, be provided as the profile. Edge detection filters can be drawn from the prior art.

At least one disclosed embodiment provides that the scanlines and the corresponding scanlines exhibit a curve, i.e., a shape or curvature, that corresponds to the respective curved path along which the object has to move as a result of being mounted on the transportation vehicle in such a way that it can move relatively. A trailer towbar, for example, at a trailer coupling can only execute a pivoting or circular movement. The scan lines are then accordingly configured as circular segments. It is ensured in this way that an image content, i.e., the object, in particular, the trailer towbar, moves along the scan line when a relative movement between the object and the transportation vehicle occurs. The reference pattern thus takes place in the overlay profile of the scanline.

At least one disclosed embodiment provides that an object-specific maximum bend angle at which the object collides with or jams against the transportation vehicle is determined with reference to the object boundaries. The maximum possible bend angle for the specific object, i.e., for example, the specific trailer towbar, can thus nevertheless be determined by the method without first knowing the shape of a trailer towbar.

At least one disclosed embodiment provides that the object is a trailer towbar of a trailer towed by the transportation vehicle. Another possible object would, for example, be an exchangeable excavator shovel or a towing bar.

At least one disclosed embodiment provides that the reference patterns of the scanlines are combined to form a two-dimensional map or description of the object. The reference patterns are interpolated between the scanlines for this purpose. A statement of the surface shape of the object, as is described by the reference patterns, is thus obtained from the two-dimensional map for every possible point of the object.

To carry out the disclosed method in a transportation vehicle, a control apparatus for a transportation vehicle is provided by the disclosure. The disclosed control apparatus can, for example, be designed as a control device of the transportation vehicle. The control apparatus comprises a computing device that is configured to carry out an exemplary embodiment of the disclosed method. The control apparatus can comprise at least one microcontroller and/or at least one microprocessor for this purpose. A program code can be made available to carry out the method, which is configured to carry out an exemplary embodiment of the disclosed method when executed by the computing device. The program code can be stored in a data memory of the computing device.

Disclosed embodiments comprise a transportation vehicle with at least one camera for capturing an external region of the transportation vehicle and with an exemplary embodiment of the disclosed control apparatus. The control apparatus is coupled to the at least one camera. The disclosed transportation vehicle may be designed as an automobile, in particular, as a passenger car or truck.

The combinations of the exemplary embodiments described also belong to the disclosure.

In the exemplary embodiment, the described components of disclosed embodiments each represent single features that are to be considered independently of one another, which each also develop the disclosure independently of one another, and are thus also to be considered individually, or in a combination other than that illustrated, as elements of the disclosure. The embodiments described can, moreover, also be extended through more of the features already described.

Elements with the same function are each given the same reference signs in the figures.

Figure 1:
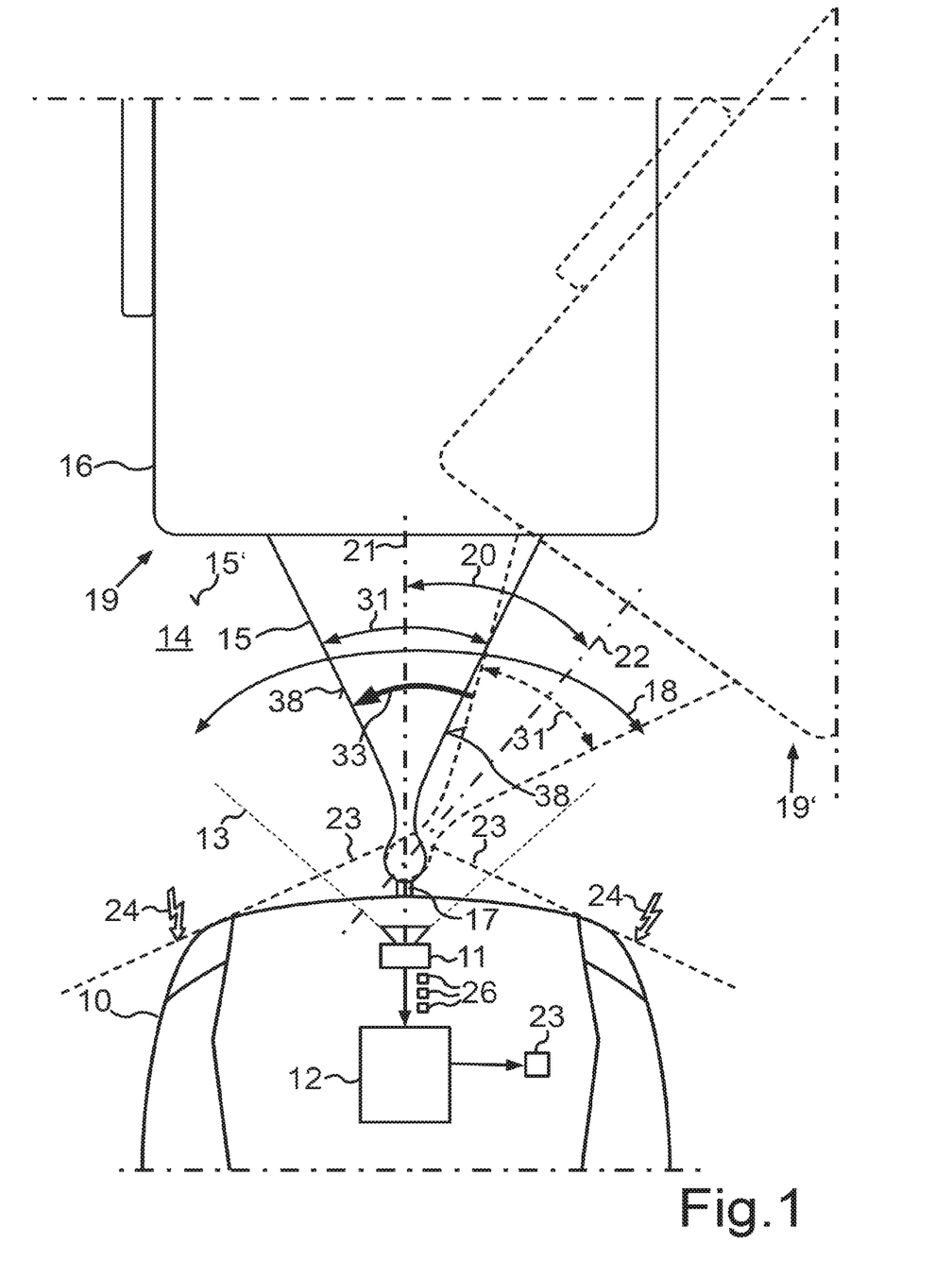
FIG. 1 shows a schematic illustration of an exemplary embodiment of a disclosed transportation vehicle.

FIG. 1 shows a transportation vehicle 10 which can be an automobile, in particular, a passenger car or truck. The transportation vehicle 10 can comprise a camera 11 which can, for example, be a video camera or a still image camera. The camera 11 can be a rear camera of the transportation vehicle 10. A control apparatus 12 of the transportation vehicle 10 is furthermore illustrated. The control apparatus 12 can, for example, be formed by a control device of the transportation vehicle 10. A capture region 13 of the camera 11 can be aimed at an external region 14 of the transportation vehicle 10, for example, in a backward region behind the rear of the transportation vehicle 10.

An object 15 can thus be captured or imaged in the external region 14 by the camera 11. In the illustrated example, the object 15 can be a trailer towbar of a trailer 16. The trailer 16 can be coupled or attached to the transportation vehicle 10 with its trailer towbar or through a trailer coupling 17 of the transportation vehicle 10. While the transportation vehicle 10 is moving, the trailer 16, or, in general, the object 15, can thus execute a relative movement 18 about the trailer coupling 17, which here represents a pivoting movement. The trailer 16 is illustrated in two possible relative positions 19, 19' which can move out of the relative movement 18. The respective current relative position 19, 19' can be described as a bend angle 20 which can, for example, be defined between a longitudinal axis 21 of the transportation vehicle 10 and a longitudinal axis 22 of the object 15. The bend angle 20 illustrated is here shown for the relative position 19'.

The control apparatus 12 can determine at the transportation vehicle 10 what maximum bend angle 23 is possible for the object 15. The maximum bend angle 23 is represented here by lines that show a respective edge of the object 15, which, with the transportation vehicle 10, causes a collision 24 with the transportation vehicle 10 when the maximum bend angle 23 is reached. The control apparatus 12 can indicate the maximum bend angle 23 in the transportation vehicle 10, whereby, for example, a driver assistance system can be configured in such a way that it autonomously or automatically, i.e., without any action on the part of the driver, guides or maneuvers the transportation vehicle 10 taking the specific maximum bend angle 23 for the object 15 into account to avoid the collision 24.

Figure 2:
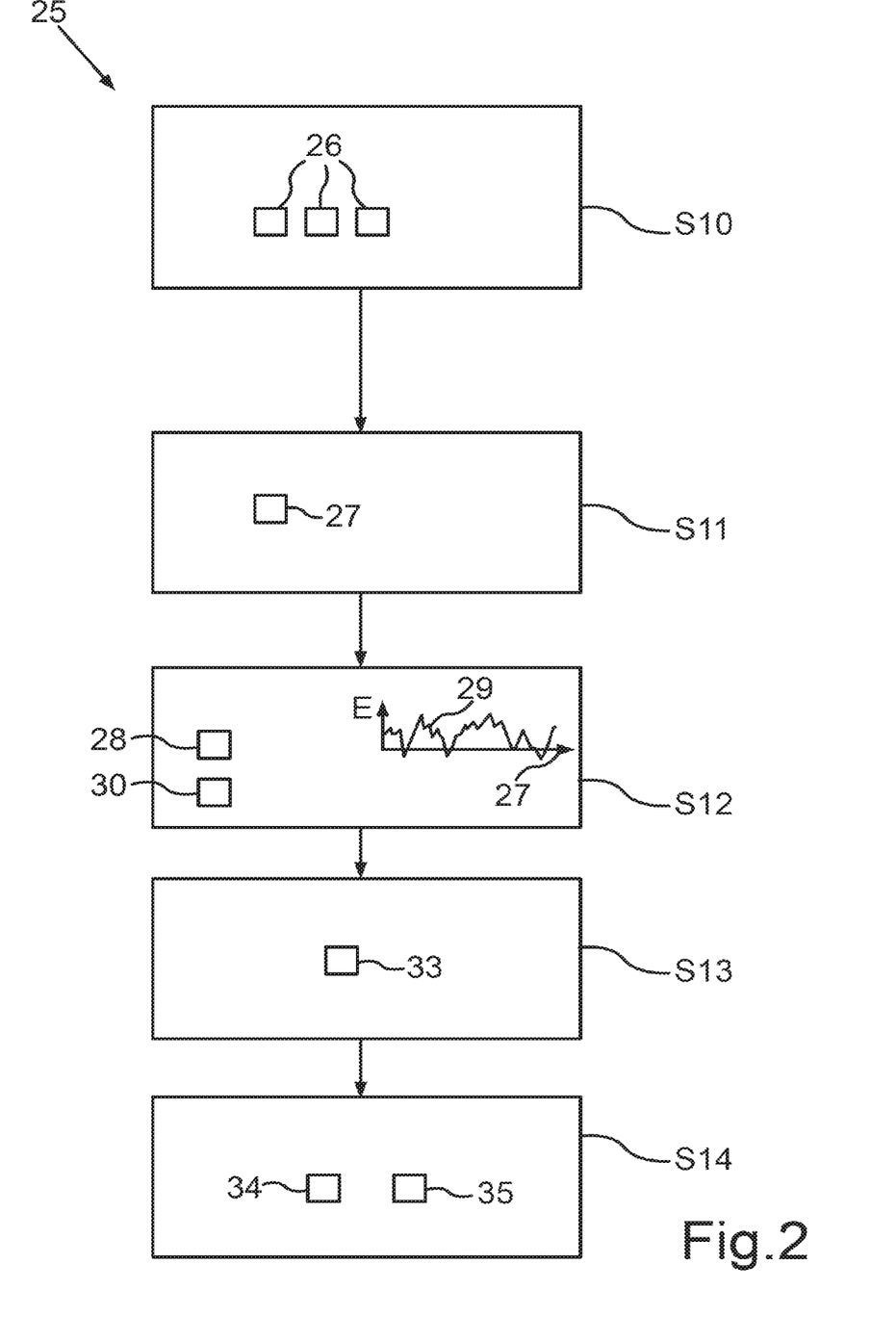
FIG. 2 shows a flow diagram of an exemplary embodiment of a disclosed method.

FIG. 2 illustrates a method 25 for this which can be carried out by the control apparatus 12 to determine the maximum bend angle 13.

In an operation at S10, if the relative movement 18 results during a movement of the transportation vehicle 10, a camera image or, more concisely, image 26 of the object 15 in front of a background 15' can be generated or recorded by the control apparatus 12 by the camera 11 at respective different measurement time points. With the alignment of the capture region 13 of the camera 11 illustrated, the background 15' can be a driving surface or ground.

Figure 3:
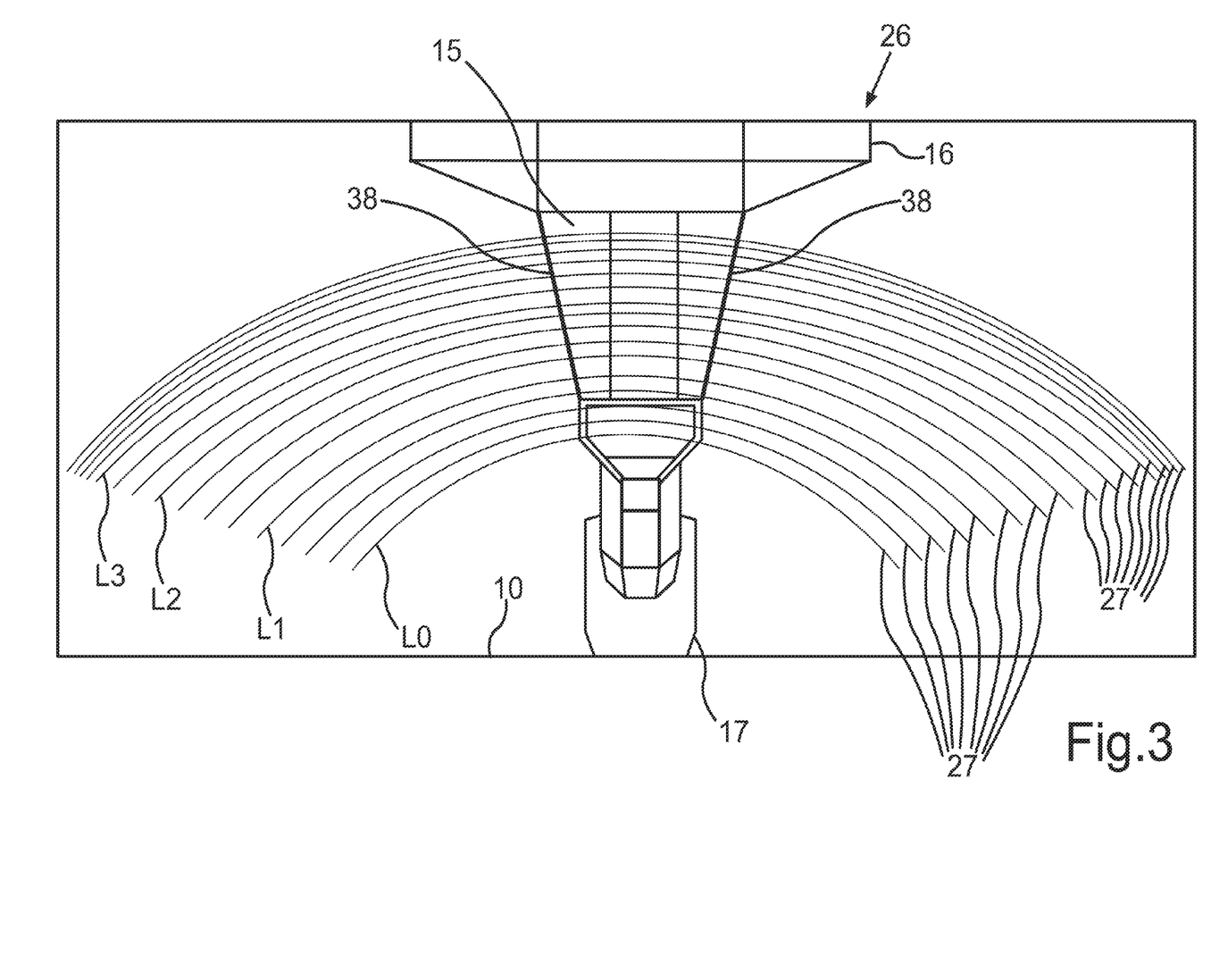
FIG. 3 shows a schematic illustration of an image generated by a camera of the transportation vehicle.
Figure 4:
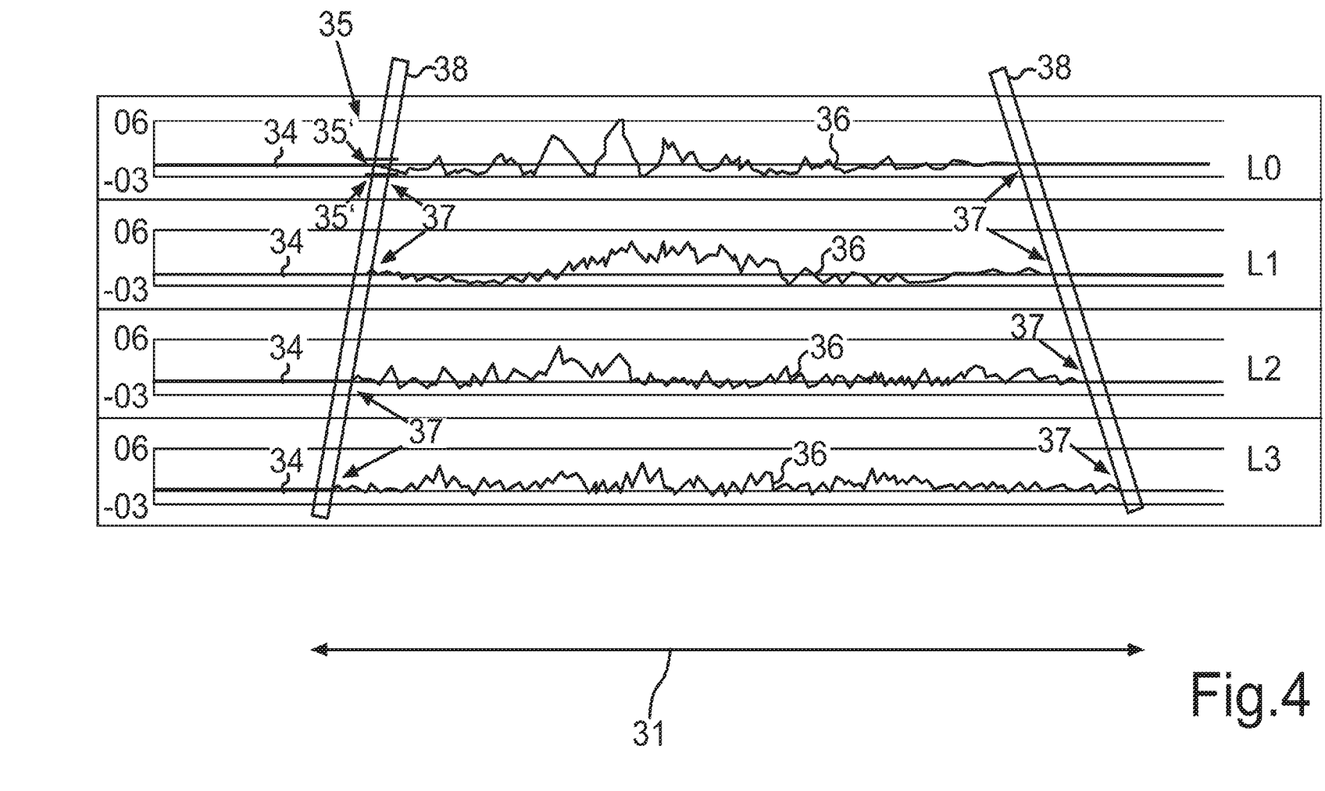
FIG. 4 shows a diagram with overlay profiles.

Reference is additionally made to FIG. 3 and FIG. 4 for the further explanations of the method 25.

FIG. 3 shows by way of example an image 26 of the object 15 such as can be recorded or generated by the camera 11. The image 26 shown in FIG. 3 can show the object 15 in the position 19. This image can be thought of as the first image.

In an operation at S11, scanlines 27 can be defined or specified in the image 26. A form of the scanlines 27 can correspond to the curve of the pivoting movement 18, as would be carried out by a point at the respective distance from the transportation vehicle 10 on the object 15. The scanlines 27 can thus correspond to circular segments, wherein a corresponding distortion due to the perspective of the camera 11 and/or the optic lens of the camera 11 accordingly changes the shape. A respective, corresponding scanline is also defined or specified for each scanline 27 in the other images 26.

In an operation at S12, a curve resulting along the scanline 27, or a resulting profile 29, can be determined for each scanline 27 for a predetermined image property 28. The image property can, for example, be a color value and/or a brightness value. An edge value of an edge detection 30, such as the edge detection 30 outputs or can generate along the scanline 27, for example, on the basis of the brightness values of the pixels of the image 26 along the scanline 27, may be used. A difference in the brightness values of adjacent pixels can, for example, be calculated as edge detection.

The profile 29 thus shows a curve of the values E of the image property 28 along the scanline 27. The formation of the profile can be carried out in each image 26, so that for each corresponding scanline of every other image 26, an accordingly corresponding profile is also determined. What is critical here is that during a rolling movement of the transportation vehicle 10 a respective object section in the profiles or an object segment 31 (see FIG. 1) match in all profiles of the corresponding scanlines 27. Only their position along the respective scanline is different, and this depends on the particular position 19, 19' of the object 15. The background 15', on the other hand, changes in every image 26 as a result of the rolling movement, so that the corresponding background sections or background segments, have a different appearance or curve in each profile.

A respective displacement distance 33 (see FIG. 1) can be determined in an operation at S13 for the profile 29 of the image 26. The displacement distance indicates how far the corresponding profile of every other image 26 must be displaced with respect to the profile 29 to achieve a maximum agreement. The displacement distance 33 can, for example, be reached on the basis of a correlation, so that the correlation maximum results as the maximum agreement.

In an operation at S14, the corresponding profile of every other image 26, displaced through the respective displacement distance 33, can be overlaid on the profile 29 of each scanline 27 of the image 26. The overlay can, for example, be achieved by a multiplication of the profiles. An overlay profile 34 is thus formed for each scanline 27.

FIG. 4 here shows the overlay profile 34 resulting in each case for four exemplary scanlines L0, L1, L2, L3, whose position is illustrated in FIG. 3. A reference pattern 36, which corresponds to the overlay profile, i.e., the object segment 31, can be determined on the basis of a predetermined demarcation criterion 35 in the overlay profile 34 of each scanline 27. The demarcation criterion 35 can, for example, provide threshold values 35', which, when exceeded or undershot by the overlay profile 34, indicate that the reference pattern 36 of the object 15 is involved. The threshold values 35' are illustrated here for an example in FIG. 4.

The respective object boundaries 38 can thus be determined on the basis of the respective boundaries 37 of the reference pattern 36 of each scanline 27. It is then possible for either the object boundaries 38, or a maximum bend angle 23 calculated from them, to be indicated by the control apparatus 12.

The automatic recognition of the maximum achievable bend angle 23 of a trailer 16 is thus made possible. The dynamic range, or the range of steering angles is thereby increased for the driver as far as the current object 15 permits.

Through the formation of profiles, for example, by an edge function, which are tracked over time, one reference pattern 26 results in total for each scanline 27. This reference pattern 26 contains the information relating to the trailer geometry, and thus to the real extent of, for example, a trailer towbar or, in general, an object 15. The bend angle 20 of the trailer 16 can thus be driven as far as the trailer towbar can be controlled or guided with a safety clearance from the transportation vehicle.

The driver can thus employ significantly greater bend angles 20, depending on his specific trailer, and thus has a greater dynamic capacity when driving with the trailer 16.

The example altogether shows how an optical detection of a maximum bend angle of a trailer is made possible on the basis of the disclosure.

LIST OF REFERENCE SIGNS

10 Transportation vehicle
11 Camera
12 Control apparatus
13 Capture region
14 External region
15 Object
15' Background
16 Trailer
17 Trailer coupling
18 Relative movement
19 Position
19' Position
20 Bend angle
21 Longitudinal axis
22 Central axis
23 Maximum bend angle (symbolic)
24 Collision
25 Method
26 Image
27 Scanline
28 Image property
29 Profile
30 Edge detection
31 Object segment
32 Displacement distance
33 Overlay profile
34 Demarcation criterion
35' Threshold value
36 Reference pattern
37 Boundary
38 Object boundary
E Value of the image property
L0, L1 Scanline
L2, L3 Scanline

The invention claimed is:

1. A control apparatus for a transportation vehicle, the control apparatus comprising a computing device to carry out a method for determining object boundaries of an object in an external region of a transportation vehicle, wherein the object is attached to the transportation vehicle so that the object moves relative to the transportation vehicle and so an image showing the object in front of a background of the external region is generated at each of at least two different measurement time points by a camera by a control apparatus of the transportation vehicle while the transportation vehicle moves, wherein:

at least one scanline is specified in a first one of the images and for each scanline a corresponding scanline is specified in each of the other images, a profile resulting along the scanline is determined for a predetermined image property for each scanline of the first image, the profile graphically representing a respective value of the predetermined image property along the scanline, and a corresponding resulting profile is determined along the respective corresponding scanline of every other image, the corresponding resulting profile graphically representing a respective value of the predetermined image property along the respective corresponding scanline of every other image, a respective displacement distance is determined for the profile of each scanline of the first image, wherein the corresponding profile of every other image must be displaced the respective displacement distance with respect to the profile to achieve a maximum agreement between the profile of each scanline of the first image and each corresponding profile of each scanline of every other image, the corresponding profile of every other image, displaced through the respective displacement distance, is overlaid on the profile of each scanline of the first image, so that an overlay profile results for each scanline, wherein the overlay profile is formed through addition or multiplication of the profiles, and a reference pattern is determined in the overlay profile of each scanline based on a predetermined demarcation criterion, and respective boundaries of the reference pattern are indicated as the respective object boundaries.

2. The control apparatus of claim 1, wherein the displacement distance is determined by a correlation, and the maximum agreement is specified here at a correlation maximum.

3. The control apparatus of claim 1, wherein the demarcation criterion allows for a threshold value comparison.

4. The control apparatus of claim 1, wherein a driving surface of the transportation vehicle is captured by the camera as the background.

5. The control apparatus of claim 1, wherein the predetermined image property comprises a color value and/or a brightness value and/or a contrast value and/or an edge detection value of an image content of the respective image.

6. The control apparatus of claim 1, wherein the scanlines and the corresponding scanlines exhibit a curve that corresponds to a respective curved track along which the object has to move as a result of being mounted on the transportation vehicle so that the object moves relatively during a relative movement.

7. The control apparatus of claim 1, wherein an object-specific maximum bend angle at which the object collides with the transportation vehicle is determined with reference to the object boundaries.

8. The control apparatus of claim 1, wherein the object is a trailer towbar of a trailer towed by the transportation vehicle.

9. The control apparatus of claim 1, wherein the reference patterns of the scanlines are combined to form a two-dimensional map of the object.

10. A transportation vehicle comprising:
at least one camera for capturing an external region of the transportation vehicle; and
a control apparatus coupled to the at least one camera, the control apparatus comprising a computing device to carry out a method for determining object boundaries of an object in the external region of the transportation vehicle, wherein the object is attached to the transportation vehicle so that the object moves relative to the transportation vehicle and so an image showing the object in front of a background of the external region is generated at each of at least two different measurement time points by the at least one camera by a control apparatus of the transportation vehicle while the transportation vehicle moves, wherein:
at least one scanline is specified in a first one of the images and for each scanline a corresponding scanline is specified in each of the other images,
a profile resulting along the scanline is determined for a predetermined image property for each scanline of the first image, the profile graphically representing a respective value of the predetermined image property along the scanline, and a corresponding resulting profile is determined along the respective corresponding scanline of every other image, the corresponding resulting profile graphically representing a respective value of the predetermined image property along the respective corresponding scanline of every other image,
a respective displacement distance is determined for the profile of each scanline of the first image, wherein the corresponding profile of every other image must be displaced the respective displacement distance with respect to the profile to achieve a maximum agreement between the profile of each scanline of the first image and each corresponding profile of each scanline of every other image,
the corresponding profile of every other image, displaced through the respective displacement distance, is overlaid on the profile of each scanline of the first image, so that an overlay profile results for each scanline, wherein the overlay profile is formed through addition or multiplication of the profiles, and
a reference pattern is determined in the overlay profile of each scanline based on a predetermined demarcation criterion, and respective boundaries of the reference pattern are indicated as the respective object boundaries.

11. The transportation vehicle of claim 10, wherein the displacement distance is determined by a correlation, and the maximum agreement is specified here at a correlation maximum.

12. The transportation vehicle of claim 10, wherein the demarcation criterion allows for a threshold value comparison.

13. The transportation vehicle of claim 10, wherein a driving surface of the transportation vehicle is captured by the camera as the background.

14. The transportation vehicle of claim 10, wherein the predetermined image property comprises a color value and/or a brightness value and/or a contrast value and/or an edge detection value of an image content of the respective image.

15. The transportation vehicle of claim 10, wherein the scanlines and the corresponding scanlines exhibit a curve that corresponds to a respective curved track along which the object has to move as a result of being mounted on the transportation vehicle so that the object moves relatively during a relative movement.

16. The transportation vehicle of claim 10, wherein an object-specific maximum bend angle at which the object collides with the transportation vehicle is determined with reference to the object boundaries.

17. The transportation vehicle of claim 10, wherein the object is a trailer towbar of a trailer towed by the transportation vehicle.

18. The transportation vehicle of claim 10, wherein the reference patterns of the scanlines are combined to form a two-dimensional map of the object.

19. A method for determining object boundaries of an object in an external region of a transportation vehicle, wherein the object is attached to the transportation vehicle so that the object moves relative to the transportation vehicle and so an image showing the object in front of a background of the external region is generated at each of at least two different measurement time points by a camera by a control apparatus of the transportation vehicle while the transportation vehicle moves, the method comprising:
specifying at least one scanline in a first one of the images;
specifying, for each scanline, a corresponding scanline in each of the other images;
determining a profile resulting along the scanline for a predetermined image property for each scanline of the first image, the profile graphically representing a respective value of the predetermined image property along the scanline;
determining a corresponding resulting profile along the respective corresponding scanline of every other image, the corresponding resulting profile graphically representing a respective value of the predetermined image property along the respective corresponding scanline of every other image;

determining a respective displacement distance for the profile of each scanline of the first image, wherein the corresponding profile of every other image must be displaced the respective displacement distance with respect to the profile to achieve a maximum agreement between the profile of each scanline of the first image and each corresponding profile of each scanline of every other image;

overlaying the corresponding profile of every other image, displaced through the respective displacement distance, on the profile of each scanline of the first image, so that an overlay profile results for each scanline, wherein the overlay profile is formed through addition or multiplication of the profiles; and determining a reference pattern in the overlay profile of each scanline based on a predetermined demarcation criterion, wherein respective boundaries of the reference pattern are indicated as the respective object boundaries.

20. The method of claim 19, wherein the displacement distance is determined by a correlation, and the maximum agreement is specified here at a correlation maximum.

21. The method of claim 19, wherein the demarcation criterion allows for a threshold value comparison.

22. The method of claim 19, wherein a driving surface of the transportation vehicle is captured by the camera as the background.

23. The method of claim 19, wherein the predetermined image property comprises a color value and/or a brightness value and/or a contrast value and/or an edge detection value of an image content of the respective image.

24. The method of claim 19, wherein the scanlines and the corresponding scanlines exhibit a curve that corresponds to a respective curved track along which the object has to move as a result of being mounted on the transportation vehicle so that the object moves relatively during a relative movement.

25. The method of claim 19, wherein an object-specific maximum bend angle at which the object collides with the transportation vehicle is determined with reference to the object boundaries.

26. The method of claim 19, wherein the object is a trailer towbar of a trailer towed by the transportation vehicle.

27. The method of claim 19, wherein the reference patterns of the scanlines are combined to form a two-dimensional map of the object.

* * * * *